United States Patent [19]

Davis, deceased et al.

[11] Patent Number: 4,959,446

[45] Date of Patent: Sep. 25, 1990

[54] POLYAMIDE WITH IMPROVED GAS BARRIER PROPERTIES FROM CYCLO-ALKYLIDENE BISPHENOXY DIACETIC ACID

[75] Inventors: Burns Davis, deceased, late of Kingsport, Tenn., by Bessie Anne Davis, executrix; Theodore R. Walker, Jr., Kingsport, Tenn.

[73] Assignee: Eastman Kodak Company, Rochester, N.Y.

[21] Appl. No.: 357,459

[22] Filed: May 26, 1989

[51] Int. Cl.$^5$ ............................................. C08G 69/26
[52] U.S. Cl. ..................... 528/185; 528/183; 528/347; 528/348; 528/349
[58] Field of Search ............... 528/185, 183, 347, 348, 528/349

[56] References Cited

U.S. PATENT DOCUMENTS

| | | | |
|---|---|---|---|
| 4,110,315 | 8/1978 | Go | 528/294 |
| 4,307,060 | 12/1981 | Go | 528/173 |
| 4,426,512 | 1/1984 | Barbee et al. | 528/173 |
| 4,436,895 | 3/1984 | Barbee et al. | 528/288 |
| 4,440,922 | 4/1984 | Barbee et al. | 528/194 |
| 4,482,695 | 11/1984 | Barbee et al. | 528/208 |
| 4,501,879 | 2/1985 | Barbee et al. | 528/288 |
| 4,510,295 | 4/1985 | Bezwada et al. | 528/173 |
| 4,546,170 | 10/1985 | Barbee et al. | 528/302 |
| 4,552,948 | 11/1985 | Barbee et al. | 528/194 |
| 4,560,741 | 12/1985 | Davis et al. | 528/302 |
| 4,574,148 | 3/1986 | Wicker et al. | 528/173 |
| 4,663,426 | 5/1987 | Wicker et al. | 528/190 |

*Primary Examiner*—Harold D. Anderson
*Attorney, Agent, or Firm*—Charles R. Martin; William P. Heath, Jr.

[57] ABSTRACT

Polyamide resins useful for forming containers having improved resistance to gas permeability comprising the reaction product of (A) a dicarboxylic acid corresponding to the structure

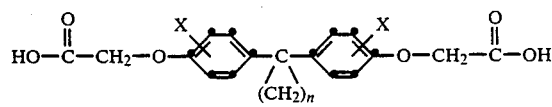

wherein X is hydrogen or unsubstituted alkyl containing 1-5 carbons and n is an integer in the range of 4 to 10, and (B) a diamine containing 5 to 16 carbon atoms.

7 Claims, No Drawings

POLYAMIDE WITH IMPROVED GAS BARRIER PROPERTIES FROM CYCLO-ALKYLIDENE BISPHENOXY DIACETIC ACID

The invention relates to polyamide resins useful for forming packages which have improved gas barrier properties.

Presently there is a strong interest in the packaging industry for protecting consumable products such as foodstuffs, medicines, and especially carbonated beverages by enveloping the substances in packages which are formed from various polymers. While molded containers formed rom known polyamides have many desirable characteristics, there is a need in the art to provide improved polyamide containers which will have lower gas permeabilities. Such improved containers would be much more versatile in their utilization and allow the containers to be used to package substances for which containers of known polyamides may not be suitable.

In accordance with the present invention, it has been found that a particular polyamide exhibits enhanced gas barrier properties. The polyamide can be described as the reaction product of (A) a dicarboxylic acid corresponding to the structure

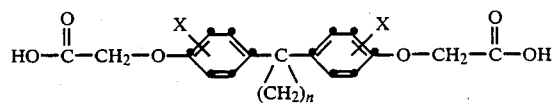

wherein X is hydrogen or unsubstituted alkyl containing 1-5 carbons and n is an integer in the range of 4 to 10, and (B) a diamine containing 5 to 16 carbon atoms.

Although n can broadly be in the range of 4 to 10, preferably n is 5 and the

moiety is a divalent radical analog of cyclohexane.

Although broadly X can either be hydrogen or an unsubstituted alkyl group containing 1-5 carbons, preferably X is hydrogen. Examples of alkyl groups include methyl, ethyl, propyl, and normal butyl.

Preferably the diamine is an aliphatic diamine containing 5 to 10 carbons and more preferably the diamine comprises a cycloaliphatic or aromatic nucleus with an aliphatic structure between the nucleus and the amine group. Examples of suitable diamines include 1,5-pentanediamine, 1,6-hexanediamine, 1,7-heptanediamine, 1,8-octanediamine, 1,9-nonanediamine, piperazine, 1,3-cyclohexanebismethylamine, 1,4-zyclohexanebismethylamine, p-xylylenediamine, m-xylylenediamine, as well as mixtures thereof, and the like. The aliphatic diamine most preferably comprises m-xylylenediamine.

The polyamides of the present invention exhibit an I.V. of at least 0.5, preferably at least 1.0 measured at 25° C. in a 60/40 by weight mixture of phenol/tetrachloroethane at a concentration of 0.5 g/100 mL.

The polyamides of the present invention are prepared by methods well known in the art. The reactants may all be reacted in a single operation or, alternatively, sequential operation may be employed. Temperatures which are suitable for forming the polyamides generally range between about 180° C. and about 330° C., with the preferred range being about 200° C. to 310° C. The reaction may be conducted under an inert atmosphere, such as nitrogen. Preferably, the latter stage of the reaction is conducted under a vacuum. Conventional catalysts are typically used.

Optionable additives, such as dyes, pigments, plasticizers, fillers, antioxidants and stabilizers may be employed in conventional amounts. Such additives may be added directly to the reaction or may be added to the final polymer.

The polyamides are formed into containers using conventional plastic processing techniques such as compression molding and blow molding. Preferably, the molded containers are biaxially oriented blow molded containers. Strong, flexible and clear sheets, films and other like structures can be formed by well known extrusion techniques. These may be formed into wrappers, bags and the like.

The polyamides may also be used to form a laminating layer between two or more permeable layers of film. In like manner, a layer of the polyamide of the present invention may be coextruded as a pipe or similar structure between two or more compatible, permeable layers. The polyamides may also be used for dip coating containers from a polymer solution in order to improve the barrier properties of a package. In each of these embodiments, the present invention offers the additional advantage of not requiring the use of a tie layer.

Containers made from the polyamides are ideally suited for protecting consumable products, such as foodstuffs, soft drinks, and medicines. These containers exhibit desirable low oxygen and carbon dioxide permeability. Because of the decreased gas transmission rates of these polyamides, they perform well in packaging applications where improved gas barrier properties are required. Typically, the containers of the present invention exhibit an oxygen permeability of less than about 3.0, preferably, less than about 2.5, and a carbon dioxide permeability of less than about 15, preferably, less than about 13, measured as cubic centimeters permeating a 1 mil thick sample, 100 inches square, for a 24 hour period under a partial pressure difference of 1 atmosphere at 30° C.

EXAMPLE

A polyamide is prepared by combining 20.35 grams (0.05 mole) of dimethyl cyclohexylidenebis-(p-phenyleneoxy) diacetate, 6.95 grams (0.05 mole) of m xylylenediamine and Z0 grams of water in a glass flask and heating under nitrogen with stirring for 30 minutes at 200° C. and 30 minutes at 250° C. Water is allowed to distill from the reaction. The nitrogen is removed and a reduced pressure of about 0.07 millimeters of mercury is applied for about 85 minutes at 250° C. A viscous product results having an inherent viscosity of about 0.51 and a glass transition temperature of about 120° C. The product is ground to pass a 3 millimeter screen, dried and pressed into films of about 3/4 mils. The films had an oxygen transmission of about 1.8 as measured in cubic centimeters permeating a 1 mil thick sample, 10 inches square, for a 24-hour period under an oxygen partial pressure difference of one atmosphere at 30° C. using a MOCON Oxtran 100 instrument.

We claim:

1. A polyamide having an inherent viscosity of at least 0.5 measured at 25 degrees C. in a 60/40 by weight mixture of phenol/tetrachloroethane at a concentration of 0.5 g/100 mL comprising the polyamide reaction product of (A) a dicarboxylic acid corresponding to the structure

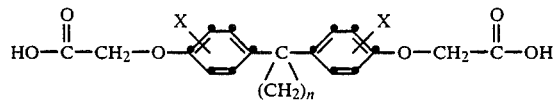

wherein X is hydrogen or unsubstituted alkyl containing 1-5 carbons and n is an integer in the range of 4 to 10, and (B) a diamine containing 5 to 16 carbon atoms.

2. The polyamide of claim 1 wherein X is hydrogen.

3. The polyamide of claim 1 wherein n is 5.

4. The polyamide of claim 1 wherein the diamine is an aliphatic diamine containing 5 to 10 carbons.

5. The polyamide of claim 4 wherein the diamine comprises a cycloaliphatic or aromatic nucleus with an aliphatic structure between the nucleus and the amine group.

6. A container formed from the polyamide of claim 1.

7. A film formed from the polyamide of claim 1.